F. C. MILLER.
WHEEL RIM.
APPLICATION FILED MAR. 18, 1907.
911,425.
Patented Feb. 2, 1909.
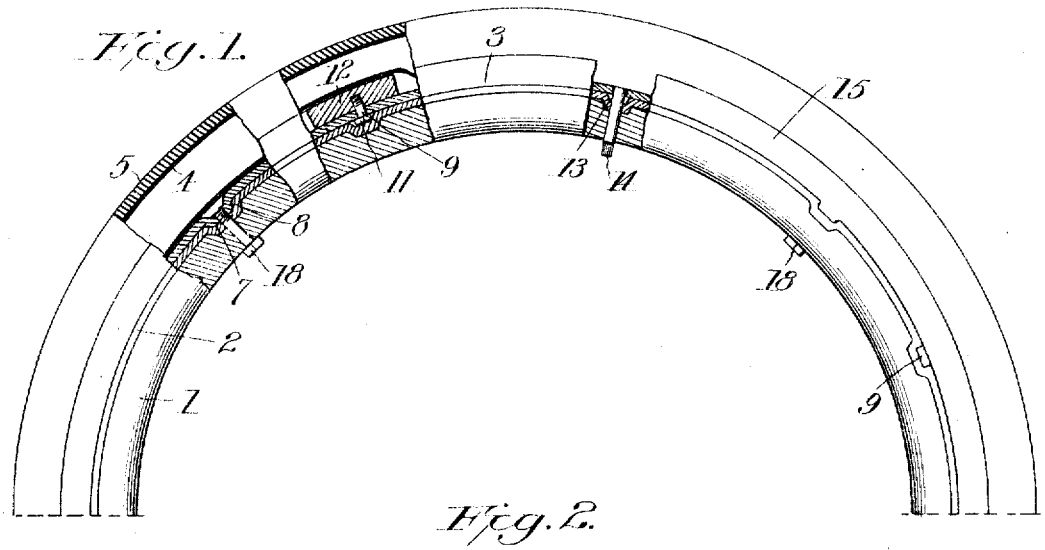
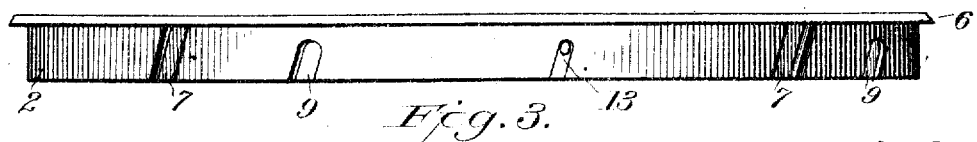
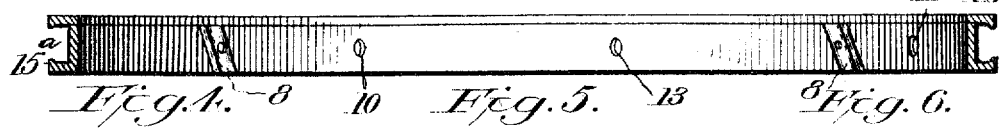
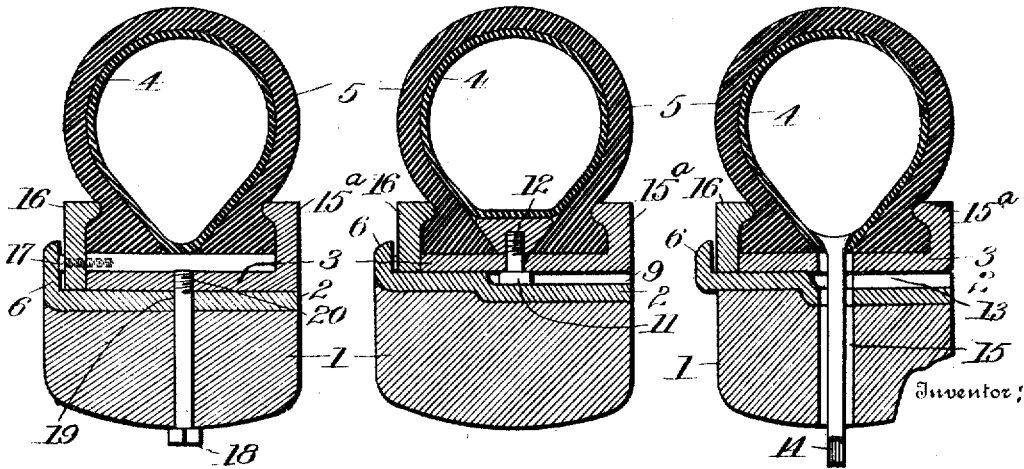
Witnesses
C. H. Walker.
F. J. Veihmeyer.
Inventor:
Franklin C. Miller,
By Elson Bro's
Attorneys.

UNITED STATES PATENT OFFICE.

FRANKLIN C. MILLER, OF EASTON, PENNSYLVANIA.

WHEEL-RIM.

No. 911,425.  Specification of Letters Patent.  Patented Feb. 2, 1909.

Application filed March 18, 1907. Serial No. 362,973.

*To all whom it may concern:*

Be it known that I, FRANKLIN C. MILLER, a citizen of the United States, residing at Easton, in the county of Northampton and State of Pennsylvania, have invented certain new and useful Improvements in Wheel-Rims; and I do hereby declare the following to be a full, clear, and exact description of the invention, such as will enable others skilled in the art to which it appertains to make and use the same.

My invention relates to wheel rims carrying rubber or cushioning tires and especially adapted for use on the wheels of motor vehicles.

The invention relates particularly to a two part rim, one part of which may be removed with the tire and another similar part substituted therefor without delaying to repair a tire while on the road.

The object of the invention is to provide a simple and practical rim of this kind which is equipped with suitable means for removably securing the tire upon the outer section and said outer section upon the inner section.

A further object is to remove as nearly as possible all strain on the bolts which secure the removable rim section upon the other section.

The invention consists in the features of construction and combinations of parts hereinafter described and more particularly pointed out in the claims concluding this specification.

In the accompanying drawing, illustrating the preferred embodiment of my invention: Figure 1 is a side elevation of a part of a rim and tire, partly in central section. Fig. 2 is an edge view of the inner rim-section alone. Fig. 3 is a view looking at the inner surface of the outer rim section. Fig. 4 is a cross-sectional view of the rim and tire, taken through the passage for one of the securing bolts. Fig. 5 is a cross-sectional view of the same parts taken through one of the lugs for securing the tire from within, and Fig. 6 is a cross sectional view of the same parts taken through the passages for the air valve.

Referring more particularly to the drawing, 1 is the wooden felly, 2 is the inner rim-section, and 3 the outer rim section. The tire illustrated comprises the inner tube 4 and the outer tube 5. The rim-sections are preferably made of sheet steel, the grooves and ribs, hereafter described, being pressed therein. The inner edge of the inner rim-section 2 is turned up to form a flange 6. In the outer surface of said rim-section are formed a plurality of diagonally arranged grooves 7, preferably four in number and spaced equidistant apart. Said grooves open on the flangeless edge of the section 2 and terminate against the flange 6. The inner face of the outer rim-section 3 is provided with ribs or ridges 8 also arranged obliquely and so positioned as to fit the grooves 7. It will be noted that because the grooves and ribs are oblique, the outer rim section must be turned slightly as it is being placed on the inner rim section whereby it is locked against direct lateral displacement. The inner rim section is also provided with other diagonally arranged grooves 9 which alternate with the grooves 7 around the rim. The outer rim-section is formed with perforations 10 registering with said grooves 9 and through which bolts 11 are passed. The heads of said bolts project on the inner surface of said outer rim-section and are introduced into the grooves 9 when said rim-sections are assembled. Said bolts secure lugs 12 having tapered sides which engage the outer tire 5 from within as shown in Fig. 5. Still another groove 13' is formed in the inner rim-section for introducing the air-valve 14 from the inner tube 4 of the tire, said valve being passed through the felly of the wheel at 15.

The outer rim section 3 is also provided with a flange 15ᵃ at one edge and a ring 16 is bolted to the other edge thereof forming the seat or channel for the tire. Either edge of the section 3 may be slipped on the inner section first, but it is preferable to have the bolted ring 16 abut against the flange 6 so that the bolts 17 will be held in place.

The outer rim section is held upon the inner rim section by means of bolts 18 passed through the felly and perforations 19 in the grooves 7 of said inner rim section and engaged with sockets 20 in the ribs 8 on said outer rim section.

I claim:

1. The combination with the felly of a wheel, of an inner rim section having transverse grooves in its surface, an outer rim section having transverse ribs adapted to engage said grooves and provided with screw-threaded sockets entering from the inner surfaces thereof, means to secure a tire upon said outer rim section and means to fasten the rim sections together comprising screw-threaded bolts passed through said felly and grooves in the inner rim section and engaging said sockets in the outer rim section.

2. The combination, with the felly of a wheel, of an inner rim section having a flange at one edge, an outer rim section also having a flange at one edge, a ring removably secured to the other edge of said outer rim section, headed bolts passed through said ring and into said outer rim section, said latter rim section mounted on the inner rim section with the heads of said bolts abutting against the flange of said inner rim section and means to fasten said rim sections together.

In testimony whereof, I affix my signature, in presence of two witnesses.

FRANKLIN C. MILLER.

Witnesses:
    FRANCES J. WAMSLEY,
    RUSSELL D. WELCH.